United States Patent [19]

Swick

[11] 4,394,811
[45] Jul. 26, 1983

[54] FUEL CONTROL FOR GAS TURBINE WITH CONTINUOUS PILOT FLAME

[75] Inventor: Robert M. Swick, Indianapolis, Ind.

[73] Assignee: General Motors Corporation, Detroit, Mich.

[21] Appl. No.: 275,785

[22] Filed: Jun. 22, 1981

[51] Int. Cl.³ .............................................. F02C 9/38
[52] U.S. Cl. .............................................. 60/39.28 R
[58] Field of Search ................................. 60/39.28 R

[56] References Cited

U.S. PATENT DOCUMENTS

| | | | |
|---|---|---|---|
| 3,085,397 | 4/1963 | Jubb et al. | 60/39.28 R |
| 3,238,993 | 3/1966 | Smith | 60/39.28 R |
| 3,808,801 | 5/1974 | Taylor | 60/39.28 R |
| 3,958,414 | 5/1976 | Smith | 60/39.28 R |

*Primary Examiner*—Louis J. Casaregola
*Attorney, Agent, or Firm*—Saul Schwartz

[57] ABSTRACT

An improved fuel control for a gas turbine engine having a continuous pilot flame and a fuel distribution system including a pump drawing fuel from a source and supplying a line to the main fuel nozzle of the engine, the improvement being a control loop between the pump outlet and the pump inlet to bypass fuel, an electronically controlled throttle valve to restrict flow in the control loop when main nozzle demand exists and to permit substantially unrestricted flow without main nozzle demand, a minimum flow valve in the control loop downstream of the throttle valve to maintain a minimum pressure in the loop ahead of the flow valve, a branch tube from the pilot flame nozzle to the control loop between the throttle valve and the minimum flow valve, an orifice in the branch tube, and a feedback tube from the branch tube downstream of the orifice to the minimum flow valve, the minimum flow valve being operative to maintain a substantially constant pressure differential across the orifice to maintain constant fuel flow to the pilot flame nozzle.

4 Claims, 3 Drawing Figures

FUEL CONTROL FOR GAS TURBINE WITH CONTINUOUS PILOT FLAME

The invention described herein was made in the performance of work under a NASA contract funded by the Department of Energy of The United States Government.

This invention relates generally to gas turbine engines and, more particularly, to an improvement in fuel control for a gas turbine engine adapted for automotive applications and having a continuous pilot flame type combustion system.

In automotive applications, gas turbine engines must perform with competitive fuel economy with respect to other types of power sources and must exhibit acceptable driveability. Both fuel economy and driveability are, to varying degrees, functions of the engine fuel control system's ability to modulate or vary the fuel supply rate to the engine's combustor from very low rates at idle to more conventional higher rates at higher power levels. In addition, where the engine is designed to operate with a continuously burning pilot flame, the fuel control system must also provide the proper quantity of fuel to the pilot flame nozzle throughout the operating range of the engine. A gas turbine engine fuel control according to this invention represents an improvement over heretofore known fuel control systems and is particularly adapted for automotive applications where fuel flow must be modulated over a wide range and where a continuous pilot flame must be simultaneously supplied with fuel.

Accordingly, the primary feature of this invention is that it provides an improved gas turbine engine fuel control system. Another feature of this invention is that it provides an improved fuel control system capable of fuel supply modulation over a wide range with continuous supply of fuel to a pilot flame. Still another feature of this invention resides in the provision in the improved fuel control system of a pump which draws fuel from a tank and supplies it to an output connected to the main combustor nozzle system and a control loop disposed between the pump outlet and the pump inlet which includes a main fuel metering or throttle valve and a minimum flow valve, the metering and minimum flow valves controlling fuel flow to the combustor main nozzle system and to the continuous pilot flame and operating on bypass or return fuel flow for effective modulation over a wide range of fuel flow rates. A still further feature of this invention resides in the provision in the improved fuel control system of simplified means for maintaining a continuous and substantially constant fuel flow to the pilot flame, the simplified means including a branch line to the pilot flame from the control loop between the metering valve and the minimum flow valve, an orifice in the branch line, and a feedback line between the branch line downstream from the orifice and the minimum flow valve which provides the minimum flow valve with a continuous pressure signal so that the latter can adjust fuel flow in the control loop to maintain a substantially constant pressure drop across the orifice and consequently a substantially constant flow in the branch line. These and other features of this invention will be readily apparent from the following specification and from the drawings wherein:

Figure 1:
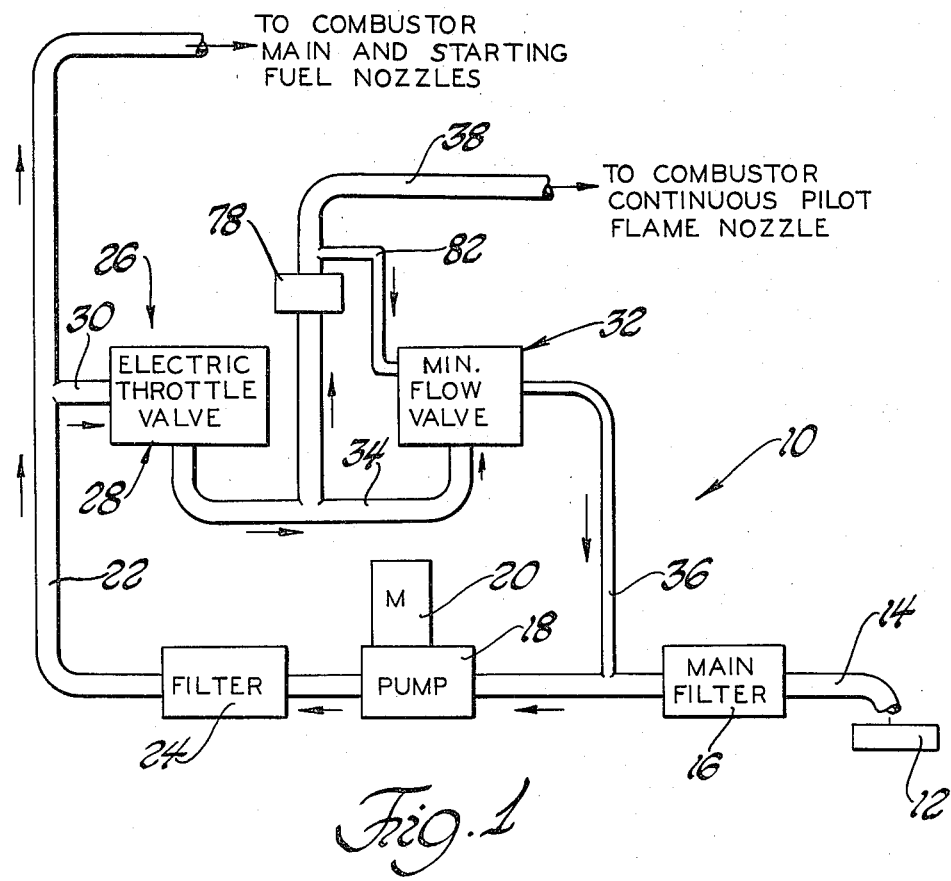
FIG. 1 is a schematic representation of a portion of an improved automotive gas turbine engine fuel control system according to this invention.

Referring now to FIG. 1 of the drawings there shown in schematic representation is a portion designated generally 10 of a fuel control system particularly adapted for use in an automotive gas turbine engine application. The portion 10 of the control system shown includes a fuel supply reservoir or tank 12 from which extends a main fuel suction line 14 having a filter 16 disposed therein. The main fuel line 14 is connected to the inlet side of a positive displacement fuel pump 18 which is driven by a direct current electric motor 20. A main fuel supply line 22 having a second filter 24 disposed therein extends from the outlet or pressure side of the pump 18 to the fuel nozzles of the gas turbine engine, not shown. The pump functions in known manner to supply fuel under pressure to the main fuel nozzles of the gas turbine engine during normal operation. It will be understood, of course, that the pump 18 also supplies fuel to the starting nozzles which are operative during the initial startup of the engine in known manner. Both the main and starting fuel nozzles are sequenced and controlled by conventional means, not shown and forming no part of this invention.

With continued reference to FIG. 1, the portion 10 of the fuel control system according to this invention includes a control loop designated generally 26 extending from the main fuel supply line 22 on the pressure or outlet side of the pump 18 back to the main fuel suction line 14 connected to the inlet side of the pump. The control loop 26 includes an electric throttle valve 28, described more fully hereinafter, connected by a tube section 30 to the main fuel supply line 22. The control loop 26 further includes a minimum flow valve 32, more fully described hereinafter, connected to the electric throttle valve 28 by an intermediate tube section 34. The control loop is closed by a third tube section 36 extending between the minimum flow valve 32 and the main fuel suction line 14 connected to the inlet side of the pump 18. A branch line 38 is connected to the intermediate tube section 34 between the electric throttle valve and the minimum flow valve and functions as described more fully hereinafter to supply fuel to a continuous pilot flame nozzle, not shown, in the gas turbine combustor. As with the main and starting fuel nozzles, the pilot flame nozzle forms no part of this invention except to the extent that it requires a continuous supply of fuel at a substantially constant flow rate.

Figure 2:
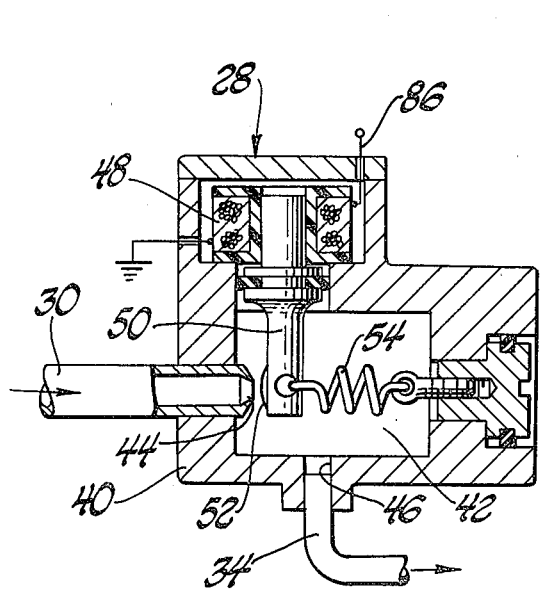
FIG. 2 is a simplified enlarged sectional view of a representative electric throttle control valve adapted for use in the improved fuel control system according to this invention.

Referring more particularly now to FIG. 2, the internal structure of the electric throttle valve 28 is there shown, it being under stood that the valve structure itself forms no part of this invention and is only representative of other functionally identical devices known in the art. The representative throttle valve 28 then includes a housing 40 which defines an internal fluid tight cavity 42. Tube section 30 projects into the cavity 42 and terminates at a tip 44. Similarly, the intermediate tube section 34 also communicates with the fluid tight cavity 42 through a port 46 in the housing 40. The electric throttle valve 28 further includes an electric torque motor 48 having a rotatable spindle 50 with a control lobe 52 thereon. The spindle 50 is disposed on the housing 40 such that the control lobe is movable into and out of close proximity to the tip 44 in response to predetermined amounts of rotation of the spindle 50. Resilient means in the form of a spring 54 disposed between the spindle 50 and the housing 40 are provided to return the spindle to a preselected initial position with respect to the tip 44 in the absence of control input from the torque motor 48.

Figure 3:
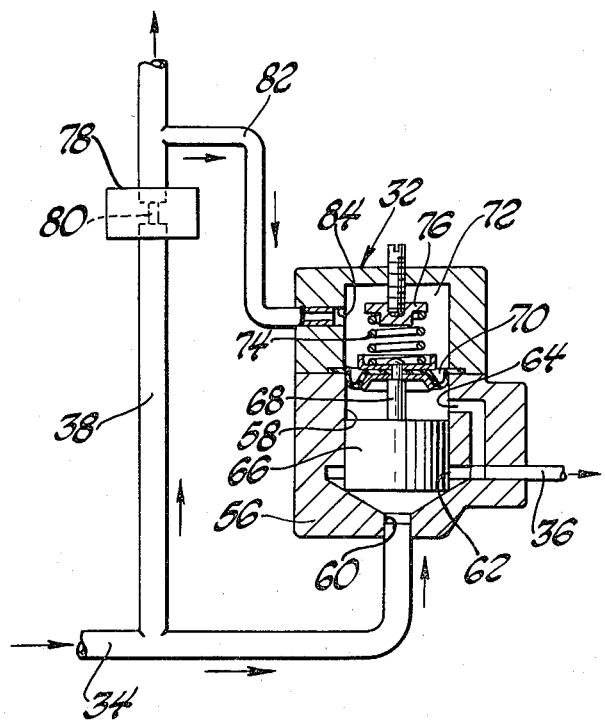
FIG. 3 is a simplified enlarged sectional view of a representative minimum flow valve adapted for use in an improved fuel control system according to this invention.

With reference now to FIG. 3, the internal structure of the minimum flow valve 32 is there shown, it being understood that the valve structure itself forms no part of this invention and is only representative of other functionally identical devices known in the art. The minimum flow valve 32 includes a housing 56 having a closed bore 58 therein. The intermediate tube section 34 communicates with one end of the closed bore 58 through a port 60 while the third tube section 36 communicates with the closed bore 58 through a regulating port 62 above the port 60 and through an exhaust port 64 still further above the port 60. A valve spool 66 is slidably disposed in the bore 58 and includes a stem 68 attached to a diaphragm 70 located above the exhaust port 64. The diaphragm 70 cooperates with the housing 56 in defining a fluid tight chamber 72 in which is disposed a spring 74 seated on the upper side of the diaphragm 70 and engaging an adjustable seat 76. The spring, accordingly, biases the valve spool 66 toward the lower end of the closed bore 58 wherein it covers the regulating port 62 to prevent communication between the port 60 and the regulating port 62 as more fully described hereinafter. By means of the adjustable seat 76 the force by which the spool is biased toward the lower end of the bore may be varied within limits.

With continued reference to FIG. 3 and to FIG. 1, the branch line 38 has disposed therein a control orifice assembly 78 which defines an orifice 80, FIG. 3, of preselected cross sectional area in the branch line 38. A feedback line 82 is connected to the branch line 38 on the downstream or lower pressure side of the orifice assembly 78 and communicates with the fluid tight chamber 72 through a passage 84 in the housing 56. Accordingly, fluid pressure in branch line 38 downstream of the orifice assembly 78 acts on the upper side of diaphragm 70 thus assisting spring 74 in biasing the spool 66 toward the lower end of the closed bore 58.

Describing now the operation of the portion 10 of the fuel control system according to this invention, under all operating conditions of the gas turbine engine the electric motor 20 is energized to drive the pump 18 at a speed sufficient to provide a pressure and volume output exceeding the requirements of the engine. The throttle valve 28, being in the control loop 26 rather than the main fuel supply line 22, operates in inverse relationship to the fuel requirement at the starting and main fuel nozzles, that is, when high flow to the nozzles is desired the throttle valve closes and when zero or little fuel is required at the nozzles the throttle valve is open. More particularly, the torque motor 48 is part of an electrical control system, represented schematically by an electrical lead 86, FIG. 2, which functions to effectively deenergize the torque motor when little or no fuel is demanded at the main and starting nozzles. In this situation the spring 54 rotates the spindle 50 to a preset position, not shown, wherein the lobe 52 is disposed away from the tip 44. Accordingly, fuel flow in the tube section 30 is substantially unrestricted so that most or all of the fuel flowing under pressure in main supply line 22 is diverted through the tube section 30 into the cavity 42 in the valve 28, diversion occurring because of valves or like restrictions in the main and starting fuel nozzle systems downstream of the tube section 30. Fuel flowing into the cavity 42 of course flows out of port 46 into the intermediate tube section 34 with little or no pressure drop across the open valve. When the engine control system requires fuel flow to the main or starting fuel nozzles, current is supplied in the torque motor circuit 86 causing the latter to rotate the spindle 50 bringing the control lobe 52 progressively closer to the tip 44 to restrict fuel flow in the tube section 30. As flow is restricted in the tube section 30 fuel bypasses the control loop and is directed through main fuel supply line 22 to the main or starting fuel nozzles. Movement of the lobe 52 toward the tip 44 is progressive with the lobe being disposed directly opposite the tip when maximum fuel supply to the engine is required. However, for purposes described hereinafter, even at full engine fuel demand the tip 44 is partially open so that a predetermined minimum amount of fuel is allowed to flow from the tube section 30 to the intermediate tube section 34. It will, of course, be appreciated that placement of the throttle valve in the control loop 26 such that the valve bypasses large quantities of fuel when the engine demands only very small quantities of fuel eliminates problems associated with leakage through the valve since any leakage creating event such as erosion of control lobe 52 or tip 44 merely serves to bypass additional quantities of fuel so that full range fuel modulation is maintained.

With reference now to FIGS. 1 and 3, the continuous pilot flame nozzle of the engine, not shown, is of the type which requires a relatively small but constant supply of fuel, as for example on the order of the one quarter (¼) pound per hour. The orifice 80 is selected to pass the appropriate amount of fuel at the appropriate rate when a pressure drop of preselected magnitude, as for example 5 PSI is maintained across the orifice. The mechanism for maintaining the preselected pressure drop is the feedback line 82 connecting the branch line 38 to the chamber 72 above the diaphragm 70. More particularly, the spring 74 biases the spool 66 toward a position blocking fluid flow from the intermediate tube section 34 to the third tube section 36. When flow is thus blocked fuel is forced through branch line 38 to the orifice 80 which permits fuel flow but also causes the pressure in intermediate section 34 to increase. As the pressure increases the spool 66 is lifted against the spring 74 in standard regulator fashion to permit fuel flow through the regulating port 62 to the low pressure existing in the third tube section 36, the volume above the spool 66 and below the diaphragm 70 being similarly exposed to the low pressure in tube section 36 through the exhaust port 64.

The spool 66 in combination with the spring 74 thus functions as a standard regulator valve to control the pressure at a preset level in the intermediate tube section 34 sufficient at the lowest expected flow rate and pressure to provide the desired rate of flow across the orifice 80. For example, when little or no fuel is required at the main and starting nozzles of the engine, maximum flow occurs through the electric throttle valve and into the intermediate tube section 34. In this situation the spool 66 would regulate the pressure in the intermediate tube section to a minimum sufficient to direct the required volume of fluid through the orifice 80 to the pilot flame nozzle but not sufficiently large to cause fuel to be diverted through the main fuel line 22 which is, of course, restricted downstream by other components such as valves and nozzles. Similarly, during periods of high engine fuel demand when, as described hereinbefore, the minimum volume of fuel flows into the intermediate tube section 34, the spool 66 may almost or completely close regulating port 62 to maintain the required minimum fuel pressure in the branch line 38 and across the orifice 80.

Referring again to FIG. 3, the operation described heretofore presupposes a substantially constant minimum fuel pressure in the branch line 38 downstream of the orifice 80. However, engine operating conditions may alter the situation to the extent that the back pressure varies from the minimum value to some higher value which, if not otherwise allowed for, would reduce the flow rate across the orifice 80 to a level below that necessary to maintain a continuous pilot flame. Accordingly, feedback line 82 functions to introduce downstream pressure in the branch line 38 to the cavity 72 above the diaphragm 70. Thus, in the event that the downstream pressure increases above the predetermined minimum level, this pressure is added to the bias of spring 74 on the spool 66 causing the latter to descend further in the bore 58 thus closing off more of regulating port 62 thereby to increase the pressure in the intermediate tube section 34 and the branch line 38 upstream of the orifice 80 so that the desired pressure differential is maintained across the orifice. Similarly, when the pressure downstream of the orifice 80 returns to the minimum level, pressure above the diaphragm 70 also decreases permitting the spool 66 to rise thus allowing increased fuel passage through regulating port 62 resulting in a decrease in the pressure in the intermediate tube section and the branch line 38 upstream of the orifice 80. The required pressure differential across the orifice 80 is thereby automatically maintained so that the fuel flow thereacross is also maintained constant.

As with the electric throttle valve 28, those skilled in the art will appreciate that the positioning of the minimum flow valve 32 in the control loop 26 eliminates the problem created by wear or tolerance variations in the valve elements. That is, the valve 32 simply functions to bypass additional fuel to the third tube section 36 instead of causing excess fuel to flow to the main and starting fuel nozzles. Similarly, those skilled in the art will appreciate that the minimum flow valve 32 can be compensated to vary the pressure in the intermediate tube section 34 in the branch line 38 in accordance with other engine operating parameters. For example, if the pilot flame nozzle is of the type having a supply of pressurized air for atomization of fuel, which air is introduced downstream of the orifice 80, the feedback line 82 could be connected so that the pressure in chamber 72 reflects the pressure of the air supply for atomization. Accordingly, should the air supply pressure increase, the minimum flow valve 32 would regulate the fuel supply to increase the pressure in branch line 38. In still a further modification, the orifice 80 could be completely removed from the intermediate line 38 and the minimum flow valve 32 compensated to reflect changes in gas turbine compressor discharge pressure so that increases of compressor discharge pressure above a preselected minimum would result in proportionate increases in the fuel pressure in branch line 38 to the continuous pilot flame nozzle.

The embodiments of the invention in which an exclusive property or privilege is claimed are defined as follows:

1. In a fuel system for a gas turbine engine of the type having a main nozzle means and continuous pilot flame nozzle means, said fuel system including a source of fuel, positive displacement pump means, fuel inlet means between said fuel source and said pump means, and distribution means between said pump means and said main nozzle means for directing pressurized fuel to said main nozzle means, the improvement comprising, means defining a control loop between said distribution means and said inlet means operative to bypass pressurized fuel back to said inlet means, throttle valve means disposed in said control loop operative to restrict fuel bypass flow in proportion to main nozzle means demand and to permit substantially unrestricted bypass flow at minimum main nozzle means demand, minimum flow valve means in said control loop downstream of said throttle valve means operative to maintain a minimum pressure in said control loop ahead of said minimum flow valve means, branch tube means connected to said continuous pilot flame nozzle means and to said control loop between said throttle valve means and said minimum flow valve means for directing fuel to said continuous pilot flame means, and pressure compensating means in said minimum flow valve means operative to increase the pressure in said control loop ahead of said minimum flow valve and in said branch line in proportion to a control parameter of said gas turbine engine.

2. The improvement recited in claim 1 wherein said throttle valve means includes an electrically controlled valve element operative to progressively restrict fuel flow in said control loop in response to a progressively increasing electronic signal from a control source, and means operative to return said valve element to a position permitting substantially unrestricted fuel flow in said control loop in the absence of said electronic signal from said control source.

3. In a fuel system for a gas turbine engine of the type having a main nozzle means and continuous pilot flame nozzle means, said fuel system including a source of fuel, positive displacement pump means, fuel inlet means between said fuel source and said pump means, and distribution means between said pump means and said main nozzle means for directing pressurized fuel to said main nozzle means, the improvement comprising, means defining a control loop between said distribution means and said inlet means operative to bypass pressurized fuel back to said inlet means, throttle valve means disposed in said control loop operative to restrict fuel bypass flow in proportion to main nozzle means demand and to permit substantially unrestricted bypass flow at minimum main nozzle means demand, minimum flow valve means in said control loop downstream of said throttle valve means operative to maintain a minimum pressure in said control loop ahead of said minimum flow valve means, branch tube means connected to said continuous pilot flame nozzle means and to said control loop between said throttle valve means and said minimum flow valve means for directing fuel to said continuous pilot flame nozzle means, means in said branch tube means defining a flow restricting orifice adapted to pass fuel at a preselected rate when a pressure differential or predetermined magnitude exists across said orifice, feedback tube means between said branch tube means downstream of said orifice and said minimum flow valve means operative to feedback the pressure in said branch tube to said minimum flow valve means, and means in said minimum flow valve means operative in response to the pressure in said feedback tube means to increase the pressure in said control loop ahead of said minimum flow valve means and in said branch tube means ahead of said orifice in proportion to an increase in presence in said feedback tube means thereby to maintain a substantially constant pressure differential across said orifice.

4. The improvement recited in claim 3 wherein said throttle valve means includes an electronically controlled valve element operative to progressively restrict fuel flow in said control loop in response to a progressively increasing electronic signal from a control source, and means operative to return said valve element to a position permitting substantially unrestricted fuel flow in said control loop in the absence of said electronic signal from said control source.

* * * * *